United States Patent [19]
Hultberg et al.

[11] Patent Number: 5,911,457
[45] Date of Patent: Jun. 15, 1999

[54] METHOD FOR PRODUCING A DOUBLE-WALLED STRUCTURE

[75] Inventors: Kent Hultberg, Bastad; Teuvo Ranta, Laholm, both of Sweden

[73] Assignee: Lindab AB, Bastad, Sweden

[21] Appl. No.: 08/956,576

[22] Filed: Oct. 23, 1997

Related U.S. Application Data

[62] Division of application No. 08/788,246, Jan. 27, 1997, Pat. No. 5,801,302.

[51] Int. Cl.$^6$ ..................................................... B23P 15/26
[52] U.S. Cl. ................................. 29/890.14; 29/890.053; 29/890.08
[58] Field of Search .............................. 29/890.08, 419.1, 29/455.1, 890.053, 890.14; 181/224

[56] References Cited

U.S. PATENT DOCUMENTS

| | | | |
|---|---|---|---|
| 1,643,008 | 9/1927 | Fentress . | |
| 2,937,436 | 5/1960 | Butler et al. | 29/419 |
| 3,474,514 | 10/1969 | Lombardi | 72/50 |
| 3,487,537 | 1/1970 | Lombardi | 29/477.7 |
| 3,694,892 | 10/1972 | Hale | 72/49 X |
| 3,903,928 | 9/1975 | Sykes et al. | 138/149 X |
| 3,974,013 | 8/1976 | Roos | 29/446 X |
| 3,981,378 | 9/1976 | Potter | 181/252 |
| 3,997,098 | 12/1976 | Van Petten | 29/890.048 |
| 4,160,312 | 7/1979 | Nyssen | 29/429 |
| 4,387,498 | 6/1983 | Morhard | 29/435 X |
| 4,823,579 | 4/1989 | Castricum | 72/49 |
| 5,162,622 | 11/1992 | Malmsten | 181/227 |
| 5,193,374 | 3/1993 | Castricum | 72/49 |
| 5,461,777 | 10/1995 | Ikeda et al. | 29/890.08 |
| 5,479,706 | 1/1996 | Tamano et al. | 29/890.08 |
| 5,670,756 | 9/1997 | Ohtaka et al. | 181/256 |
| 5,722,149 | 3/1998 | Lesage et al. | 29/33 D X |
| 5,737,832 | 4/1998 | Bubb | 29/781 |

FOREIGN PATENT DOCUMENTS

| | | |
|---|---|---|
| 546790A1 | 6/1993 | European Pat. Off. . |
| 1146971 | 11/1957 | France . |
| 1307015 | 9/1962 | France . |
| 57-154314 | 9/1982 | Japan . |
| 58-58928 | 4/1983 | Japan . |
| 1211608 | 8/1989 | Japan . |
| 206768 | 8/1939 | Switzerland . |
| 652869 | 3/1979 | Switzerland . |
| 1574480 | 9/1980 | United Kingdom . |
| 2122256 | 1/1984 | United Kingdom . |
| WO 9407620 | 4/1994 | WIPO . |

*Primary Examiner*—I Cuda
*Attorney, Agent, or Firm*—Weingarten, Schurgin, Gagnebin & Hayes LLP

[57] ABSTRACT

In a method of producing a double-walled structure, such as a silencer for use in a ventilation duct system, use is made of an arrangement having a forming head for forming helically-wound lock-seam tubing. In the forming head, a perforated metal strip is helically wound together with an air-permeable cloth strip such that the tubing fed out of the forming head has an outer cover of said cloth. The tube assembly consisting of the perforated tube and the cloth cover is provided with an outer tubular layer of insulating material and then inserted in a casing which makes the silencer complete.

5 Claims, 3 Drawing Sheets

METHOD FOR PRODUCING A DOUBLE-WALLED STRUCTURE

This application is a division of application Ser. No. 08/788,246, filed Jan. 27, 1997 now U.S. Pat. No. 5,801,302.

FIELD OF THE INVENTION

The present invention relates to double-walled structures, such as silencers for use in ventilation duct systems. The invention also concerns the production of such double-walled structures. Further, the invention is related to the field of producing helically-wound lock-seam tubing, in particular for circular ventilation duct systems.

BACKGROUND OF THE INVENTION

Double-walled structures for use in ventilation duct systems are well known in the art. In a brochure entitled "LindabSilencer" printed in 1988 and distributed by Lindab Ltd., various double-walled silencers are disclosed. On p. 2 of this Lindab brochure, the general construction of such silencers is described. A typical Lindab silencer comprises an inner tube of perforated thin metal sheet and an outer tube or casing which typically is a helically-wound lock-seam tube of thin metal sheet. The space between the two tubes is filled with sound-absorbing material, such as mineral wool, of different types and densities depending on the field of use. Between the perforated inner tube and the sound-absorbing material, there is a thin fiber layer, the purpose of which is to prevent fibers from the sound-absorbing material from being drawn into the air duct defined by the inner tube. Without such fiber layer, there is a risk that suction forces in the air duct will draw the insulation material into the duct and thereby impair the sound-absorbing effect of the silencer.

Several examples of circular double-walled silencers are shown in the above-mentioned Lindab brochure. Most of these silencers have end pieces at each end which are provided with tubular portions for connection to circular ducts in the ventilation duct system. Other double-walled structures (not shown in the Lindab brochure) are provided with insulation material over their full length, in which case no end pieces are mounted.

For the sake of completeness, reference is also made to Japanese Patent Abstract No. 1,211,608, in which an additional silencer structure is disclosed. Further, British Patent Publication No. 2,102,256 is mentioned as background art, in which FIG. 3 shows still another silencer.

In the prior-art described above, the thin fiber layer for covering the perforated inner tube is provided in the following manner. First, a rectangular piece of fiber material taken from a web-like supply is cut in a first separate operation. The shape of the fiber material piece is adapted to the shape and circumference of the perforated inner tube. Second, the cut fiber material piece is swept about the perforated inner tube, and third the fiber piece is fastened thereon, for instance by means of adhesive. Again, these are separate operations.

The operations are time-consuming and are often carried out manually, which is disadvantageous. The unnecessarily complicated operations for applying the fiber layer increase the total cost of the double-walled structure. Thus, there is a need for providing a new type of double-walled structure which is produced in an improved way.

It is known to use an inner tube in the shape of a helically-wound tube, which can basically be produced in an apparatus of the type disclosed in French Patent Publication No. 1,307,015. The purpose of the apparatus disclosed in this French publication is to provide a helically-wound lock-seam tube covered by a plastic layer on its inside. The inner plastic cover is intended to prevent corrosion on the inside of the tube. Thus, a strip of plastic material is applied on that side of the metal strip which forms the inside of the tube before the strip is supplied to the forming head. In order to provide a continuous plastic cover on the inside of the tube, the apparatus is equipped with a special welding unit for welding the joints of the helically formed plastic strip inside the tube.

SUMMARY OF THE INVENTION

An object of the invention is to eliminate the drawbacks mentioned above by providing an improved double-walled structure.

Another object of the invention is to provide an improved method and an improved apparatus for producing the double-walled structure in such a manner that the above-mentioned drawbacks are eliminated.

These objects are achieved by a double-walled structure comprising: an inner tube having a perforated wall; an outer casing spaced from and enclosing the inner tube; a filler material provided between the inner tube and the casing; and a fluid-permeable cover tightly applied on the outside of the inner tube and covering the perforations of the same; wherein the inner tube is a helically-wound lock-seam tube formed from a first perforated strip; and wherein the fluid-permeable cover is formed from a second strip helically wound together with the first strip.

The above objects are also achieved by a method for producing a double-walled structure, comprising the steps of: applying a second strip of a fluid-permeable material on a first perforated strip, the second strip being applied on that side of the first strip which forms the outside of a tube; helically forming the first and second strips together in a forming head such that the tube fed out of the forming head has its outside tightly covered by the fluid-permeable material; cutting the tube into a predetermined length; applying a filler material on the outside of the tube such that the tube and the filler material form an assembly; and enclosing the assembly in a casing.

Further, the objects are achieved by an arrangement for producing a double-walled structure, comprising a forming head for forming helically-wound lock-seam tubing; means for applying a second strip of a fluid-permeable material on a first perforated strip before said forming head, the second strip being applied on that side of the first strip which forms the outside of the tubing; means for helically forming the first and second strips together in the forming head such that the tube fed out of the forming head has its outside tightly covered by the fluid-permeable material; means for cutting the tube into a predetermined length; means for applying a filler material on the outside of the tube such that the tube and the filler material form an assembly; and means for enclosing the assembly in a casing.

By applying the second strip of fluid-permeable material on the first perforated strip and feeding these two strips together into the forming head, in which the two strips are helically wound together for forming the tubing, the double-walled structure itself as well as the production thereof can be remarkably simplified. No manual operations are required, but the inner perforated tube covered by the fluid-permeable material can be produced continuously in one machine, which has desirable advantages in that fewer and simpler operations are carried out, whereby the production is rationalized.

Since the fluid-permeable strip is helically wound together with the perforated strip, the cover of fluid-permeable material is securely fastened tightly on the perforated inner tube. Normally no additive is needed, and the production is simplified and more effective than prior-art techniques. In a preferred embodiment of the invention, the longitudinal edge portions of the strip of fluid-permeable material are secured in the helical lock seam of the perforated tube, which significantly reduces the risk that the fluid-permeable cover comes loose from the tube.

The invention is applicable to many kinds of double-walled structures, such as long ventilation ducts which are provided with insulating material over their full length and which have no end pieces. Further, it should be noted that the double-walled structure of the invention is applicable to other products, such as filter assemblies in which the space between the tubes is filled with filter material for filtering various fluids.

BRIEF DESCRIPTION OF THE DRAWINGS

The invention will now be described in more detail with reference to the accompanying schematic drawings which show preferred embodiments of the invention and in which.

DESCRIPTION OF PREFERRED EMBODIMENTS

Figure 1:
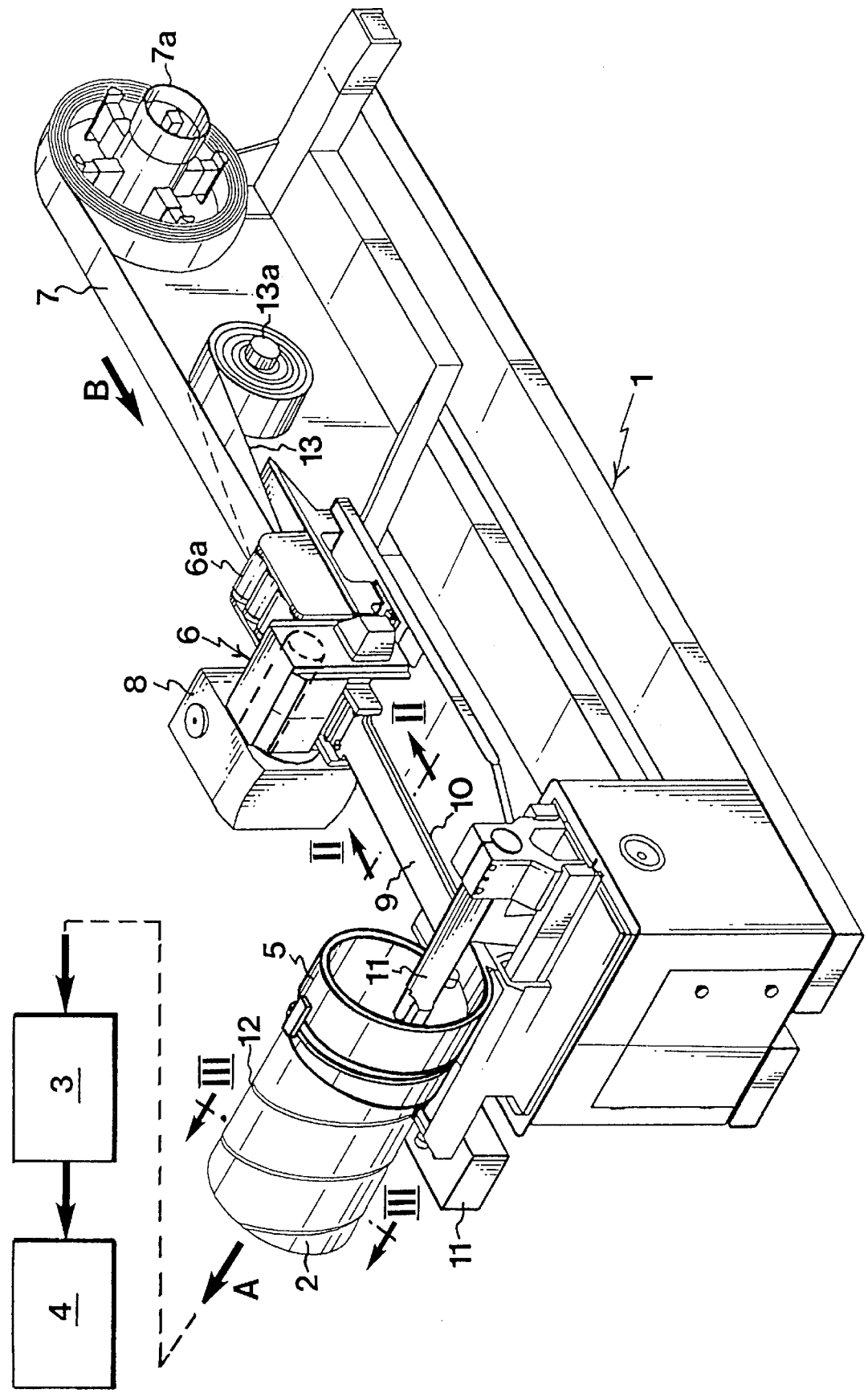
FIG. 1 is a perspective view from above of an arrangement for producing a double-walled structure in accordance with an embodiment of the invention.

FIG. 1 shows an arrangement for producing a double-walled structure in accordance with a presently preferred embodiment of the invention. In the illustrated, non-limitative example, the double-walled structure is a silencer for use in a ventilation duct system (see FIG. 7).

Figure 5:
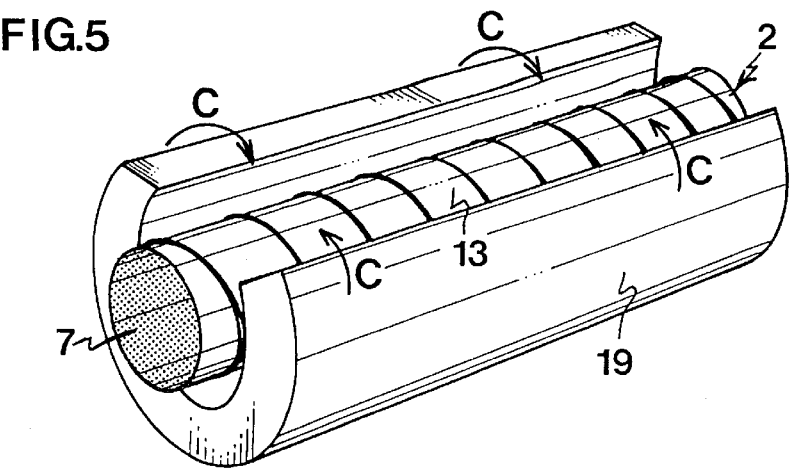
FIG. 5 shows the application of a piece of filler material on the tubing produced in the arrangement shown in FIG. 1.
Figure 6:
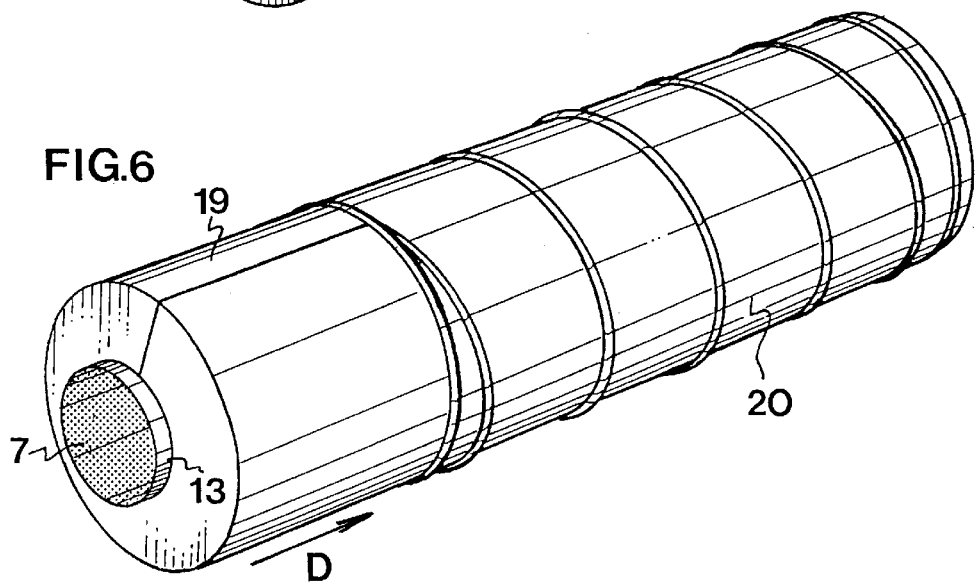
FIG. 6 shows the insertion of the tube assembly in an outer tube.
Figure 7:
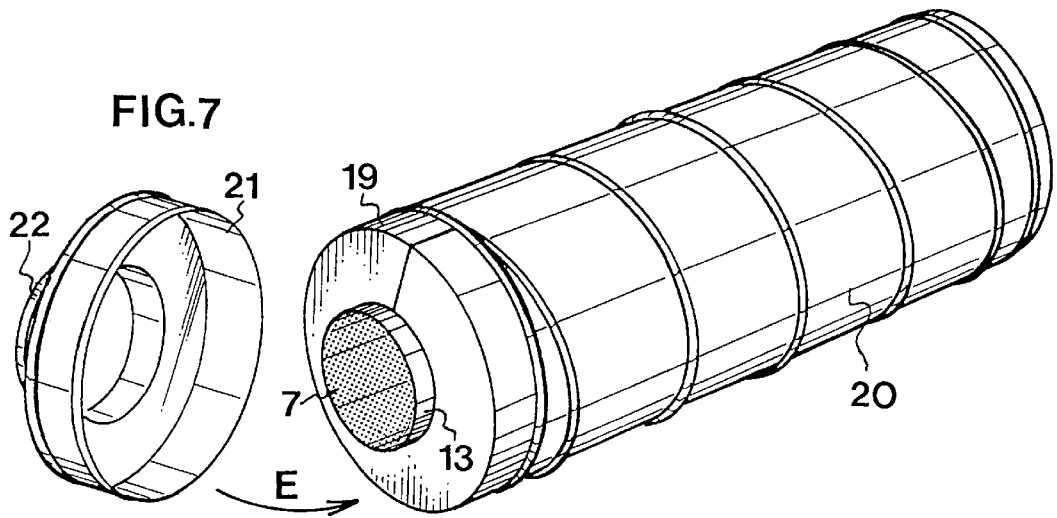
FIG. 7 shows the mounting of an end piece on one end of the double-walled structure.

The arrangement comprises a machine 1 for producing helically-wound lock-seam tubing 2, a schematically shown apparatus 3 for applying filler material, here sound-absorbing material, on the outside of the tubing 2 such that the tubing 2 and the sound-absorbing material form a tube assembly (see FIG. 5), and a schematically shown apparatus 4 for enclosing said tube assembly in a casing (see FIGS. 6–7). The two apparatus 3 and 4 may be of known construction and are therefore not described in detail here.

The machine 1 comprises a forming head 5 for forming the helically-wound lock-seam tubing 2 which is fed out of the forming head 5 (arrow A). Further, the machine 1 has a drive roller assembly 6 for feeding a first strip 7 which is wound on a reel 7a to the forming head 5 (arrow B). The rollers of the drive roller assembly 6 are driven by a drive unit 8. Guiding plates 9 and 10 are provided for guiding the first strip 7 into the forming head 5 (see FIG. 2).

After the forming head 5, a cutting unit 11 is provided for cutting the tubing 2 into suitable, predetermined lengths. The cutting unit 11 may be of a type known in the art and need not be described in detail here.

The first strip 7 is a perforated metal strip which forms the body of the tubing 2 fed out of the forming head 5 and having a helical lock seam 12.

A second strip 13 wound on a reel 13a is fed to the forming head 5 by means of the drive roller assembly 6. The second strip 13, which in this example is of a flexible, air-permeable material, is applied on that side of the perforated metal strip 7 which forms the outside of the tube body. Thus, the two strips 7 and 13 are joined in the drive roller assembly 6 and fed together into the forming head 5, in which they are helically formed into the tubing 2. It is preferred that the two strips 7 and 13 have substantially the same width. In an embodiment which in practice has shown excellent results, the air-permeable strip 13 is a cloth material, preferably a polymer material, and the metal strip 7 is of thin metal sheet.

Figure 2:
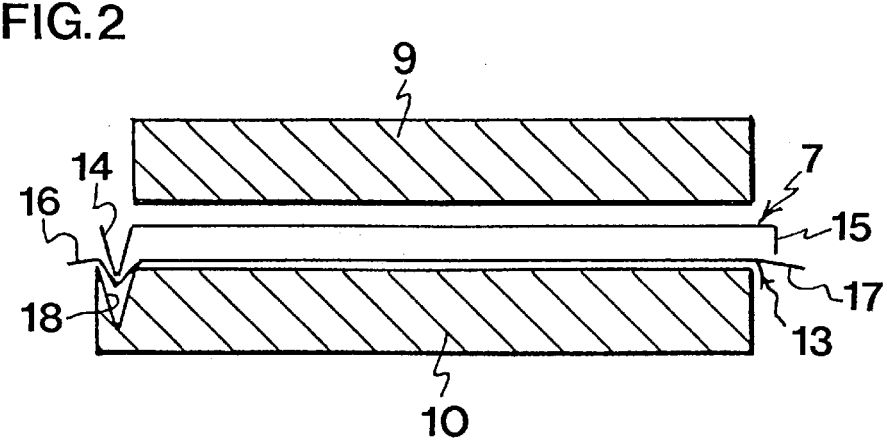
FIG. 2 is a cross-section along the line II—II in FIG. 1 showing a metal strip, a cloth strip and guiding plates.

FIG. 2 illustrates the two guiding plates 9 and 10 (shown somewhat spaced apart for clarity reasons) and the two strips 7 and 13. Before the drive roller assembly 6, the two longitudinal edge portions 14 and 15 of the metal strip 7 are edge-formed as shown in FIG. 2 by means of edge-forming rollers 6a (see FIG. 1). This forming of the edge portions 14 and 15 is carried out in order to obtain a secure lock seam 12 of the tubing 2. The cloth strip 13, which has longitudinal edge portions 16 and 17, is held on the upper surface of the lower guiding plate 10. As is shown in FIG. 2, the lower guiding plate 10 has a V-shaped groove 18, which corresponds to the V-shaped edge portion 14 of the metal strip 7. The guiding plates 9 and 10 serve to guide the two strips 7 and 13 applied together in a secure manner into the forming head 5.

Figure 3:
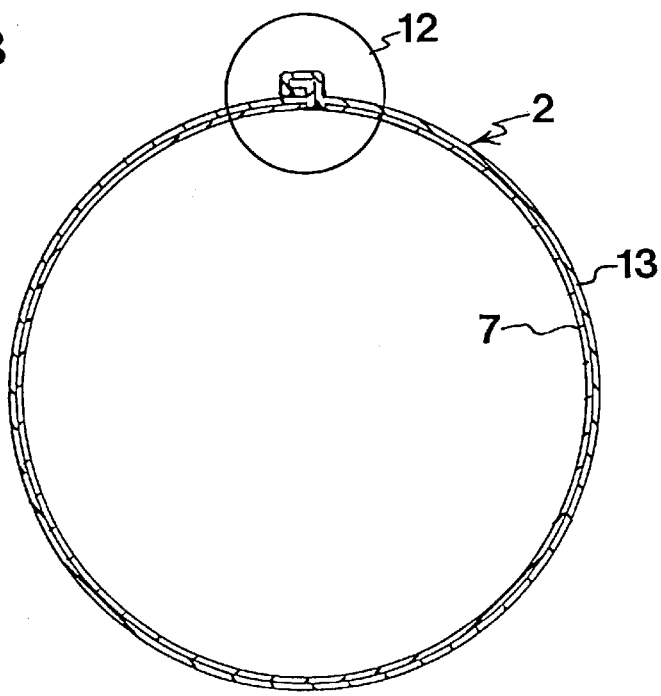
FIG. 3 is a cross-section of a tubing fed out of a forming head, along the line III—III in FIG. 1.

FIG. 3 shows a cross-section of the tubing 2 after the forming head 5. The two strips 7 and 13 are helically wound together, and the cloth strip 13 tightly covers the perforations of the metal strip 7 forming the body of the tubing 2.

Figure 4:
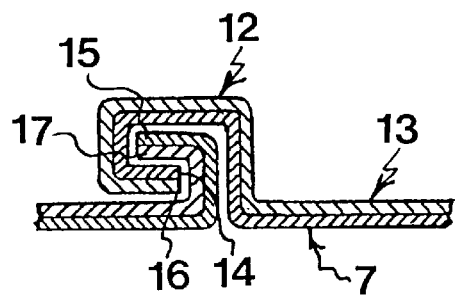
FIG. 4 is a detail of FIG. 3 showing on a larger scale a cross-section of a lock seam of the tube.

A cross-section of the lock seam 12 of FIG. 3 is shown in detail in FIG. 4. For clarity reasons, the two bent edge portions of the tube wall of the lock seam 12 are shown at a small distance from each other in FIG. 4. In practice, these tube edge wall portions are clinched together in order to obtain a secure lock seam 12. It is, however, clear from FIG. 4 that the edge portions 16 and 17 of the cloth strip 13 are lock-seamed together with the edge portions 14 and 15 of the metal strip 7 such that the edge portions 16 and 17 of the cloth strip 13 are securely fastened in the helical lock seam 12 of the tubing 2.

The tubing 2 fed out of the forming head 5 is adapted to form the inner tube of a silencer for use in a ventilation duct system. The final steps for producing the silencer are shown in FIGS. 5–7.

FIG. 5 shows how a rectangular piece 19 of a filler or sound-absorbing material, preferably wool, is swept around the tubing 2 (arrows C) consisting of a perforated inner tube body formed of the metal strip 7 and covered by an air-permeable layer formed by the cloth strip 13. The wool piece 19 is applied on the outside of the tubing 2, and this tube assembly 2, 19 is inserted in a tubular casing 20 coaxial with the inner tube (see FIG. 6, arrow D).

Preferably, the casing 20 is a helically wound lock-seam tube formed from a strip of thin metal sheet. FIG. 7 shows how an end piece 21 is mounted on one end of the casing 20 (arrow E). The casing 20 is provided with one end piece 21 at each end. Each end piece 21 has a tubular portion 22 for connection to circular ducts (not shown) in a ventilation duct system. After mounting of the two end pieces 21, which are optional, the manufacturing of the aimed-at double-walled silencer is finished. In the double-walled structure achieved, the inner tube 2 is a first wall and the outer tube 20 is a second wall.

It should be noted that the shape of the casing 20 is not crucial; it may alternatively have other forms and cross-sections, such as elliptic, rectangular, etc.

Briefly, the method according to the preferred embodiment of the invention is carried out as follows.

The perforated metal strip 7 is fed to the forming head 5 together with the cloth strip 13 applied on that side of the metal strip 7 which forms the outside of the tube body. The two strips 7 and 13 are helically wound in the forming head 5, and the edge portions 16 and 17 of the cloth strip 13 are securely fastened in the helical lock seam 12. The tubing 2 consisting of the perforated, helically wound strip 7 covered by the likewise helically wound cloth strip 13 is cut in a suitable length corresponding to the aimed-at silencer. In the apparatus 3, the sound-absorbing material 19 is applied on the outside of the tube 2, and finally the tube assembly 2, 19 consisting of the helically wound tubing 2 and the sound-absorbing material 19 applied thereon is inserted in the tubular casing 20. Optionally, the casing 20 is closed by two end pieces 21.

Finally, it should be pointed out that the inventive concept is by no means restricted to the embodiments described herein, but several modifications are feasible within the scope of the appended claims. In particular, it should be mentioned that the production of the double-walled structure may be carried out either in line, in which case the machine 1 and the two apparatus 3 and 4 are arranged in line, or in separate stations. In the latter case, lengths of tubing 2 are put in an intermediate supply before providing the sound-absorbing material 19 on the tubing 2 and before insertion of the tube assembly 2, 19 in the outer tube or casing 20. The filler material to be applied on the tubing fed out of the forming head can either be applied in the shape of a rectangular piece which is swept around the tubing, or applied in the shape of a strip which is helically wound on the outside of the tubing (not shown). Of course, there are other alternatives for applying the filler material.

What we claim and desire to secure by Letters Patent is:

1. A method for producing a double-walled structure, comprising the steps of:

applying a strip of fluid-permeable material to a perforated strip to form a composite strip;

helically forming said composite strip in a forming head to form a tube having an inside surface and an outside surface, said fluid permeable material tightly covering the outside surface of the perforated strip as formed into said tube;

cutting said tube into a predetermined length;

applying a filler material on the outside surface of said tube such that said tube and filler material form an assembly; and enclosing said assembly in a casing.

2. The method of claim 1, including the further step of securing longitudinal edge portions of said strip of fluid-permeable material in a helical lock seam formed in said tube.

3. The method of claim 1, including the further step of applying said filler material in the shape of a rectangular piece which is swept and tightened around said tube.

4. The method of claim 1, including the further step of applying said filler material in the shape of a strip which is helically wound on the outside surface of said tube.

5. The method of claim 1, including the further step of employing said double-walled structure as a silencer for use in a ventilation duct system.

* * * * *